United States Patent
Miyamoto

(10) Patent No.: US 7,239,050 B2
(45) Date of Patent: Jul. 3, 2007

(54) UNIAXIAL DRIVE UNIT AND SURFACE SHAPE MEASURING APPARATUS USING THE SAME

(75) Inventor: Hiroshi Miyamoto, Mitaka (JP)

(73) Assignee: Tokyo Seimitsu Co., Ltd., Mitaka-shi, Tokyo (JP)

( * ) Notice: Subject to any disclaimer, the term of this patent is extended or adjusted under 35 U.S.C. 154(b) by 272 days.

(21) Appl. No.: 10/807,133

(22) Filed: Mar. 24, 2004

(65) Prior Publication Data
US 2004/0189102 A1 Sep. 30, 2004

(30) Foreign Application Priority Data
Mar. 28, 2003 (JP) .............................. 2003-090613

(51) Int. Cl.
*H02K 41/00* (2006.01)
(52) U.S. Cl. .............................. 310/12; 310/14; 310/20
(58) Field of Classification Search ............ 310/12–14, 310/20, 80
See application file for complete search history.

(56) References Cited
U.S. PATENT DOCUMENTS 5,299,662 A    4/1994  Reddy et al.
5,909,066 A    6/1999  Nanba et al. .................. 310/12
5,949,161 A *  9/1999  Nanba .......................... 310/12
6,008,552 A   12/1999  Yagoto et al. ................. 310/12
6,367,159 B1* 4/2002  Naoi et al. .................... 33/552

FOREIGN PATENT DOCUMENTS

| EP | 0917004 A2 | 5/1999 |
| JP | 62-166764 A * | 7/1987 |
| JP | 08-331834 | 12/1996 |
| JP | 11-150973 | 6/1999 |
| JP | 2001 190088 A | 7/2001 |
| JP | 2002-139317 | 5/2002 |

* cited by examiner

*Primary Examiner*—Tran Nguyen
(74) *Attorney, Agent, or Firm*—David S. Safran

(57) ABSTRACT

There is provided a uniaxial drive unit using a linear motor having a fixed part which is a rod-shaped magnet fixed to a unit body and formed so that the N poles and the S poles are arranged alternately; and a moving part which is a ring-shaped member having a coil member, fitted on the fixed part, and capable of moving along the fixed part. A driving section provided so as to be slidable in the uniaxial direction with respect to the unit body is connected to the moving part or a balance weight fixed to the moving part by a winding motion transmission member via a winding motion transmitting support member provided near one end or both ends of the unit body.

12 Claims, 13 Drawing Sheets

$F = \mu M$

UNIAXIAL DRIVE UNIT AND SURFACE SHAPE MEASURING APPARATUS USING THE SAME

BACKGROUND OF THE INVENTION

1. Field of the Invention

The present invention relates to a uniaxial drive unit and a surface shape measuring apparatus using the unit. More particularly, it relates to a uniaxial drive unit using a linear motor in a driving section and a surface shape measuring apparatus using the unit.

2. Description of the Related Art

As a linear motor capable of being used for a uniaxial drive unit, linear motors having various configurations have conventionally been known. Among these, a linear motor having a fixed part, which is a rod-shaped magnet, and a moving part, which is a ring-shaped member fitted on the fixed part, having a coil member, and being capable of moving linearly along the fixed part, has features of less cogging, less unevenness of speed, and the like, and hence has been coming onto the market (for example, trade name: SHAFT MOTOR, manufactured by GMC HILLSTONE Co., Ltd.).

Also, as an improved technology for such a linear motor, a linear motor capable of operating steadily with high accuracy has been proposed (for example, see Japanese Patent Application Publication Nos. 8-331834 and 11-150973).

On the other hand, as a surface shape measuring apparatus, a surface roughness measuring apparatus, contour measuring apparatus, roundness measuring apparatus, three-dimensional coordinate measuring apparatus, and the like have conventionally been known.

In most of the surface shape measuring apparatuses, a contact type probe and an object under test are moved relatively while the probe is brought into contact with the surface of the object under test, by which the surface shape of object under test is measured.

The relative movement of the probe and the object under test is generally linear motion for the surface roughness measuring apparatus, contour measuring apparatus, and three-dimensional coordinate measuring apparatus, and is generally arcuate motion for the roundness measuring apparatus. Also, for the roundness measuring apparatus as well, the Z-axis movement (vertical movement) of probe is generally linear motion.

The driving for such linear motion is generally performed by a combination of a motor, gear, and screw or a combination of a motor, pulley, and wire (Japanese Patent Application Publication No. 2002-139317).

Specifically, in the surface roughness measuring apparatus, contour measuring apparatus, and roundness measuring apparatus, linear driving is performed by the combination of a motor, gear, and screw, and a contact type detector is moved linearly while being supported by a slide guide surface (or hydrostatic bearing surface) having high straightness accuracy, by which the surface roughness, contour, roundness, or the like of an object under test is measured. Also, in the three-dimensional coordinate measuring apparatus; linear driving is performed by the combination of a motor, pulley, and wire, and a contact type detector is moved linearly while being supported by a hydrostatic bearing surface having high straightness accuracy, by which the shape and dimensions of an object under test are measured.

In this case, generally, the linear driving of the surface roughness measuring apparatus and contour measuring apparatus is in the X-axis direction, that of the roundness measuring apparatus is in the R-axis and Z-axis directions, and that of the three-dimensional coordinate measuring apparatus is in the X-axis, Y-axis, and Z-axis directions.

However, when the above-described conventional linear motor is applied to the uniaxial drive unit, the linear motor generates heat, so that a problem is pointed out in that a dimensional error of the whole of unit occurs due to the heat.

Also, in the case where the above-described conventional linear motor is applied to the uniaxial drive unit and the unit is used in a state in which the driving thrust is varied by the gravity of the moving part, a problem is also pointed out in that the variation in the driving thrust is difficult to restrain.

FIGS. 13 to 15 are schematic views for illustrating this phenomenon. FIG. 13 schematically shows a cross section of a linear motor 1. A moving part 4, which is a ring-shaped member having a coil member, is fitted on a fixed part 2, which is a rod-shaped magnet in which the N poles and the S poles are arranged alternately in a linear form. Due to the interaction between the magnetic flux of the fixed part 2 and the electric current flowing in the coil member of the moving part 4, the moving part 4 moves linearly along the fixed part 2 in accordance with Fleming's left-hand rule. The coil member of the moving part 4 is supplied with an electric current by a driving circuit, not shown.

In this case, if friction is present between the fixed part 2 and the moving part 4, states as shown in FIGS. 14 and 15 are established when the linear motor 1 is not driven by energization. FIG. 14 shows a state in which the linear motor 1 is arranged horizontally, and FIG. 15 shows a state in which the linear motor 1 is arranged at an inclination angle $\Theta$ with respect to the horizontal surface. The friction coefficient between the fixed part 2 and the moving part 4 is taken as $\mu$.

In FIG. 14, there is no relative movement of the fixed part 2 and the moving part 4 in the state in which the moving part 4 is not energized. In order to move the moving part 4 to the right or the left, a driving force $F=\mu M$ is required to overcome the frictional force caused by the gravity M of the moving part 4.

On the other hand, in FIG. 15, a component force $M \cdot \sin \Theta$ due to the gravity of the moving part 4 is applied in the linear movement direction along the fixed part 2. Also, a component force $M \cdot \cos \Theta$ due to the gravity of the moving part 4 is applied in the direction perpendicular to the linear movement direction along the fixed part 2.

In order to move the moving part 4 to the left by overcoming the component force due to the gravity of the moving part 4 and the frictional force in this state, a driving force of $F=M \cdot \sin \Theta + \mu M \cdot \cos \Theta$ is required as shown in FIG. 15A. On the other hand, in order to move the moving part 4 to the right, a driving force of $F=-M \cdot \sin \Theta + \mu M \cdot \cos \Theta$ is required as shown in FIG. 15B. Thus, in the conventional linear motor of this type, the driving thrust is varied by the gravity of the moving part 4.

Also, if the angle $\Theta$ is large in the state as shown in FIG. 15, the moving part 4 moves to the right (drops) due to the gravity of the moving part 4. In order to restrain this phenomenon and to keep the moving part 4 at the present position, it is necessary to provide a driving force in the left direction by energizing the moving part 4 to achieve a balance. However, if the state in which the moving part 4 is energized is maintained, heat is generated in the moving part 4, which presents a problem in that a dimensional error of the whole of unit occurs due to the heat.

SUMMARY OF THE INVENTION

The present invention has been made in view of the above situation, and accordingly an object thereof is to provide a uniaxial drive unit using a linear motor in which the driving thrust is not varied by the gravity of a moving part of the linear motor, and no dimensional error occurs due to heat generation etc.

On the other hand, in a surface shape measuring apparatus, the above-described conventional linear driving mechanism has problems as described below, and the improvement thereof has been demanded. Specifically, a surface roughness measuring apparatus, contour measuring apparatus, roundness measuring apparatus, and three-dimensional coordinate measuring apparatus have a problem in that the movement speed of a detector is low, and hence high-speed movement cannot be performed.

Also, the surface roughness measuring apparatus, contour measuring apparatus, and roundness measuring apparatus have a problem in that vibrations at the time of high-speed movement is large. The surface roughness measuring apparatus and contour measuring apparatus have a problem in that the construction is complicated, and a highly accurate gear-to-gear pitch dimension is required. Also, the three-dimensional coordinate measuring apparatus has a problem in that high-speed movement cannot be performed because a wire is used.

The present invention has been made in view of the above situation, and accordingly another object thereof is to provide a surface shape measuring apparatus having a driving mechanism which can overcome the above-described conventional problems.

To achieve the above object, the present invention provides a uniaxial drive unit using a linear motor, comprising: a fixed part which is a rod-shaped magnet fixed to a unit body and formed so that the N poles and the S poles are arranged alternately, a moving part which is a ring-shaped member having a coil member, fitted on said fixed part, and capable of moving along said fixed part, a driving section which is driven by driving force of said linear motor, the driving section being slidable in the uniaxial direction with respect to said unit body, a winding motion transmission member which transmits driving force of said linear motor to said driving section; and a winding motion transmitting support member which supports said winding motion transmission member, the winding motion transmitting support member being provided near one end or both ends of said unit body, wherein said driving section is connected to said moving part or a member fixed to said moving part by said winding motion transmission member via said winding motion transmitting support member.

According to the present invention, the driving section provided so as to be slidable in the uniaxial direction with respect to the unit body is driven by the linear motor via the winding motion transmission member. By using this configuration, the driving section can be separated from the linear motor through a predetermined distance. As a result, the problem in that a dimensional error of the whole of unit occurs due to the heat generated in the linear motor can be solved.

The "winding motion transmission member" is a machine element in winding transmission in mechanism study, and generally, a belt, chain, wire, etc. correspond to this member. Also, the "winding motion transmission support member" is similarly a machine element in winding transmission, and generally, a pulley, belt pulley, sprocket, etc. correspond to this member.

In the present invention, it is preferable that a balance weight be fixed to the moving part so as to balance with the driving section. In the case where the driving section is driven by the linear motor via the winding motion transmission member, if the balance weight is fixed to the moving part so as to balance with the driving section, the driving thrust is not varied by the gravity of the moving part, and no dimensional error occurs.

The term "balance weight" is defined as "a weight added to eliminate imbalance of a rotating body in grinding, or a weight used for balancing with the gravity of a cross rail of a gantry machine tool or a spindle head of a boring machine" (Dictionary of Cutting, Grinding, and Polishing, compiled by Society of Grinding Engineers, published by Kogyo Chyosakai Publishing Co., Ltd., 1995). In this specification, the term "balance weight" is used in the latter meaning of the above definition.

In the present invention, it is preferable that the total weight of the balance weight and the moving part be approximately equal to the weight of the driving section. In such a condition, the effects of the present invention can be achieved.

In the present invention, it is preferable that the total weight of the balance weight and the moving part be in the range of 20% up and down with respect to the weight of the driving section. In such a condition as well, the effects of the present invention can be achieved.

In the present invention, it is preferable that the end of the winding motion transmission member be fixed to the driving section in substantially the same plane as the slide face between the unit body and the driving section. By this configuration, a driving force from the liner motor is transmitted to the point of action of the driving section via the winding motion transmission member. Therefore, the operation accuracy of driving section can be ensured.

Also, the present invention provides a surface shape measuring apparatus which measures the surface shape of an object under test by relatively moving a detecting section along the surface of the object under test, characterized in that the above-described uniaxial drive unit is used to relatively move the detecting section fixed to the driving section.

According to the present invention, the surface shape measuring apparatus is driven by the above-described uniaxial drive unit. Therefore, advantageous effects, which are characteristic of the linear motor used for the uniaxial drive unit, of no maintenance, no worn parts, capability of low-vibration driving, wide speed range, high rigidity, simple construction, no backlash, etc. can be achieved.

The surface shape measuring apparatus means an apparatus for measuring the surface shape of an object under test by relatively moving the detecting section along the surface of the object under test, which is represented by a surface roughness measuring apparatus, contour measuring apparatus, roundness measuring apparatus, three-dimensional coordinate measuring apparatus, and the like, and also includes an apparatus for measuring not only the outer surface of an object but also, for example, the inner peripheral surface of a cylindrical object.

As the detecting section, a contact type detecting section is generally used which makes measurement while a probe is brought into contact with the surface of an object under test. However, the detecting section is not limited to this type, and includes a non-contact type detecting section such as a laser type detecting section.

As described above, according to the present invention, the driving section provided so as to be slidable in the uniaxial direction with respect to the unit body is driven by the linear motor via the winding motion transmission member. By using this configuration, the driving section can be separated from the linear motor through a predetermined distance. As a result, the problem in that a dimensional error of the whole of unit occurs due to the heat generated in the linear motor can be solved.

Also, according to the present invention, the surface shape measuring apparatus is driven by the above-described uniaxial drive unit. Therefore, advantageous effects, which are characteristic of the linear motor used for the uniaxial drive unit, of no maintenance, no worn parts, capability of low-vibration driving, wide speed range, high rigidity, simple construction, no backlash, etc. can be achieved.

DETAILED DESCRIPTION OF THE PREFERRED EMBODIMENTS

Figure 1:
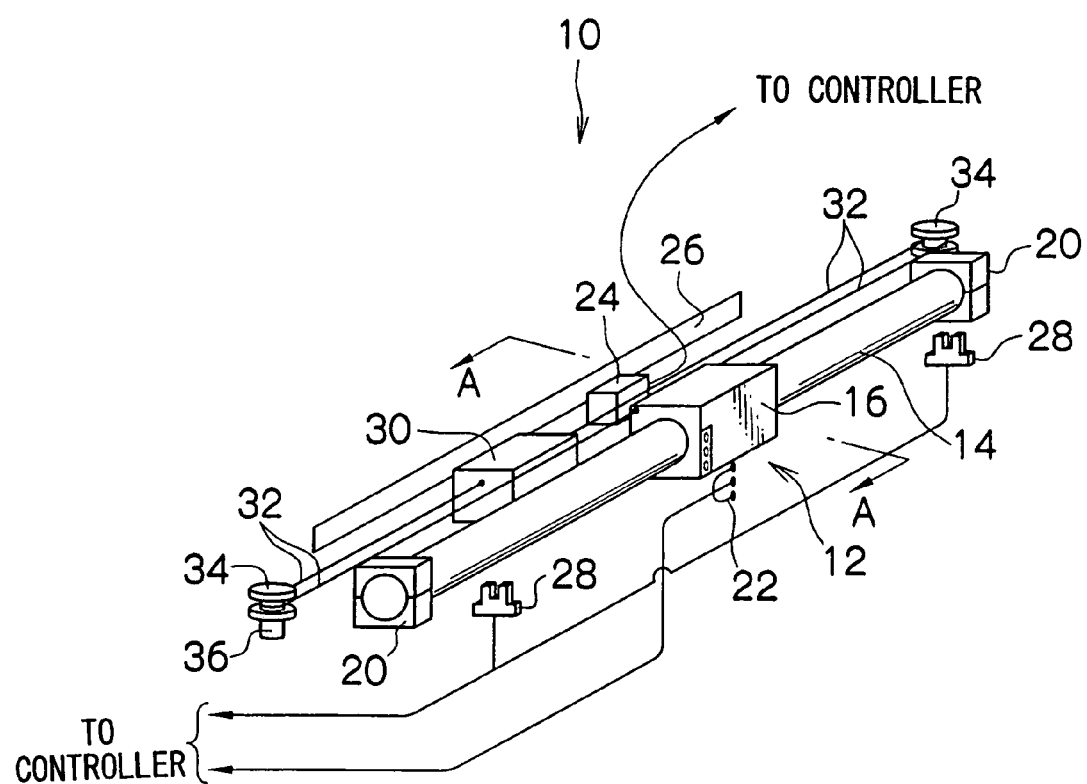
FIG. 1 is a general perspective view schematically showing a uniaxial drive unit in accordance with the present invention.
Figure 2:
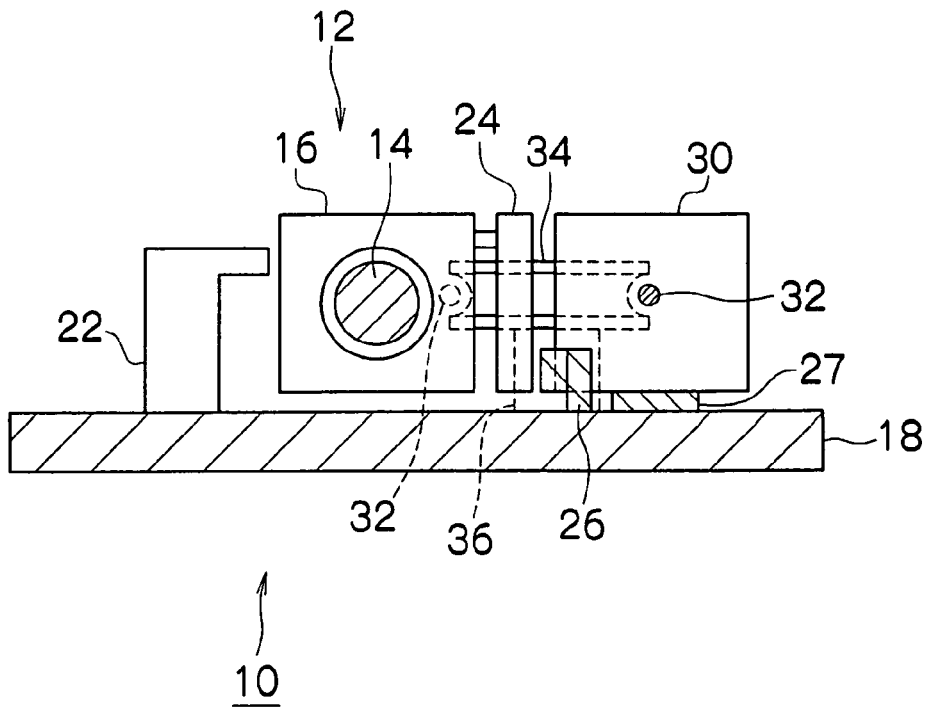
FIG. 2 is a sectional view taken along the line A—A of FIG. 1.
Figure 3:
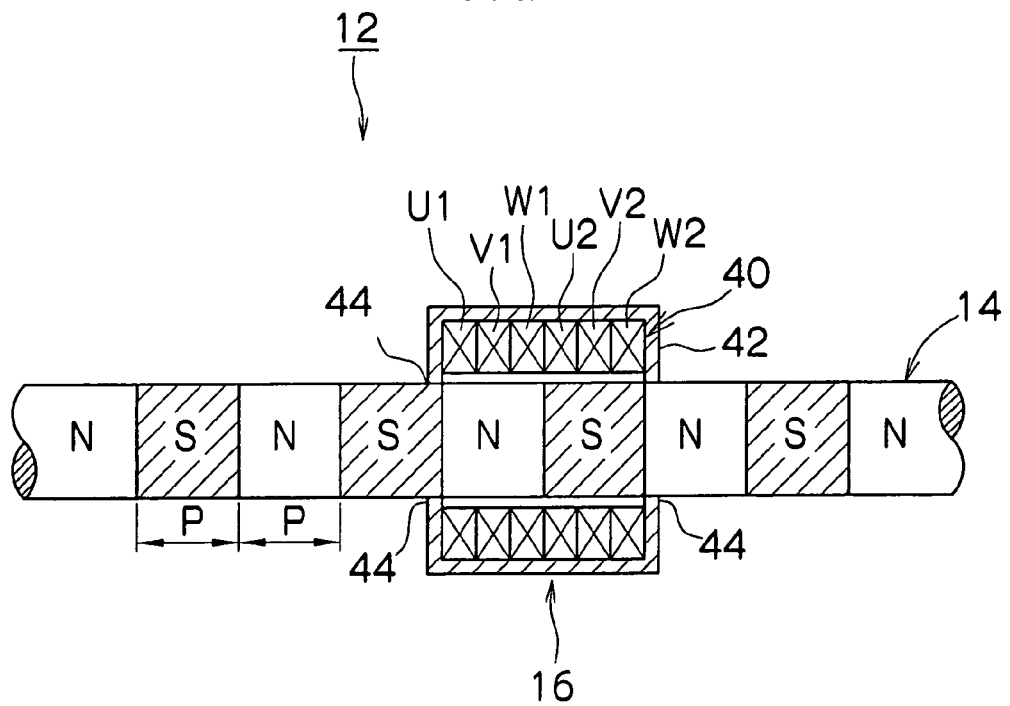
FIG. 3 is an enlarged sectional view of an essential portion of a linear motor.

A first embodiment of a uniaxial drive unit in accordance with the present invention will now be described in detail with reference to the accompanied drawings. FIG. 1 is a general perspective view schematically showing a uniaxial drive unit 10 in accordance with the present invention. FIG. 2 is a sectional view taken along the line A—A of FIG. 1, and FIG. 3 is an enlarged sectional view of an essential portion of a linear motor 12.

The uniaxial drive unit 10 is made up of a linear motor 12 mainly comprising a fixed part 14 and a moving part 16, a base plate 18 (not shown in FIG. 1), which is a unit body for fixing the elements, fixing members 20, 20 for fixing both ends of the fixed part 14 to the base plate 18, a cable bare 22 for supplying electric power to the moving part 16, an encoder 24 for detecting the position in the uniaxial direction of the moving part 16 and an encoder scale 26, limit sensors 28, 28 which are provided near both ends of the fixed part 14 to detect an end limit of the moving part 16, a driving section 30 provided so as to be slidable in the uniaxial direction with respect to the base plate 18 (unit body), pulleys 34, 34, which are winding motion transmission support members provided near both ends of the fixed part 14, pulley shafts 36, 36 which are fixed to the base plate 18 to pivotally support the pulleys 34, 34, and a wire 32, which is a winding motion transmission member for connecting the driving section 30 to the moving part 16 via the pulleys 34, 34.

Next, the details of the linear motor 12 will be described with reference to FIG. 3 and other figures. The linear motor 12 is a linear motor of what is called a shaft type. As described above, the linear motor 12 is configured so that the moving part 16, which is a ring-shaped member having a coil member as a principal portion, is fitted on the fixed part 14, which is a straight rod shaped shaft member in which a magnet for producing a field is formed.

The fixed part 14 is formed of a material that is machinable and magnetizable, such as a Fe—Cr—Co based metal, and the cross section thereof is formed into a circular shape. Also, the fixed part 14 is magnetized so that there is formed magnetic flux distribution having an equal pitch along the lengthwise direction thereof, preferably of a substantially rectangular shape. Thereby, in the fixed part 14, a magnetized portion for driving, in which the N poles and the S poles are arranged alternately with the same magnetic pole width P, is formed, which forms a field magnet. The magnetic pole width can be made, for example, 30 mm.

A coil member 40 of the moving part 16 comprises two sets of coil groups (a first set of coil group and a second set of coil group) in which three coils of U phase, V phase, and W phase form one set. The first set of coil group comprises coils U1, V1 and W1, and these coils are arranged in the lengthwise direction of the fixed part 14 in that order. The second set of coil group comprises coils U2, V2 and W2, and these coils are arranged in the lengthwise direction of the fixed part 14 in that order. These coils each are formed so as to have a width one-third of the magnetic pole width P.

These coils constituting the coil member 40 of the moving part 16 are fixed and integrated by coating the outer peripheral surface thereof with an adhesive. The coil member 40 is incorporated in a hollow portion of a moving part frame 42 of a hollow rectangular parallelepiped shape, and is supported integrally on the inner peripheral surface of the moving part frame 42.

In both-end portions of the moving part frame 42 of the moving part 16, there are provided bearing portions 44, 44 that are fitted on the fixed part 14 and are slidable over the fixed portion 14. By the action of the bearing portions 44, 44, the moving part 16 can be moved smoothly along the fixed part 14.

Due to the interaction between the magnetic flux of the fixed part 14 and the electric current flowing in the coil member 40 of the moving part 16, the moving part 16 moves linearly along the fixed part 14 in accordance with Fleming's left-hand rule. The coil member 40 of the moving part 16 is supplied with an electric current via the cable bare 22 by the driving circuit, not shown.

The driving section 30 shown in FIGS. 1 and 2 is provided so as to be slidable in the uniaxial direction with respect to the base plate 18 (unit body). As a linear motion guide 27 for sliding the driving section 30 with respect to the base plate 18, a rolling guide (using a ball, roller, etc.), a sliding guide, and other various mechanisms can be used. As the linear motion guide 27, for example, LM guide (trade name) manufactured by THK Co., Ltd. can be used. A configuration may be used in which the driving section 30 is directly supported on the base plate 18 so as to be slidable in the uniaxial direction without the use of the linear motion guide 27.

As the driving section 30 shown in FIGS. 1 and 2, a driving section having a weight such as to balance with the moving part 16 is preferably selected. Specifically, when the drive unit is used with other elements installed to the moving part 16, it is preferable that the driving section 30 have substantially the same weight as the sum of the weights of the moving part 16 and the installed elements. Also, when the drive unit is used without installing other elements to the moving part 16 or when the drive unit is used with other elements installed to the moving part 16 but the weight of the installed elements is slight, it is preferable that the driving section 30 have substantially the same weight as that of the moving part 16.

Further, a configuration can be used in which the weight of the driving section 30 can be increased or decreased according to other elements installed to the moving part 16.

As shown in FIGS. 1 and 2, the driving section 30 can be connected to the moving part 16 by forming the wire 32 into an endless loop shape and by winding the wire 32 around the pulleys 34, 34 to support the moving part 16 and the driving section 30.

All of other elements (the base plate 18, the fixing member 20, the cable bare 22, the encoder 24, the encoder scale 26, the limit sensor 28) of the uniaxial drive unit 10 are publicly known, so that the explanation thereof is omitted.

Figure 14:
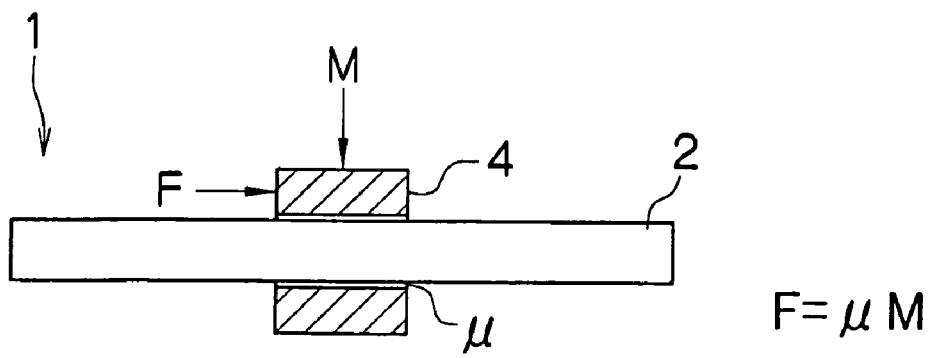
FIG. 14 is a schematic view for illustrating problems with a conventional linear motor.

The following is a description of the operation of the uniaxial drive unit 10. In a state in which the uniaxial drive unit 10 (the linear motor 1) is arranged horizontally (see FIG. 14), there is no relative movement of the fixed part 14 and the moving part 16 when the moving part 16 is not energized. Also, even in a state in which the uniaxial drive unit 10 (the linear motor 1) is arranged at a predetermined inclination angle with respect to the horizontal plane, there is no relative movement of the fixed part 14 and the moving part 16 due to the balancing effect of the driving section 30. Therefore, there is no need for energizing the moving part 16, so that no dimensional accuracy error occurs due to heat generation etc.

Figure 15A:
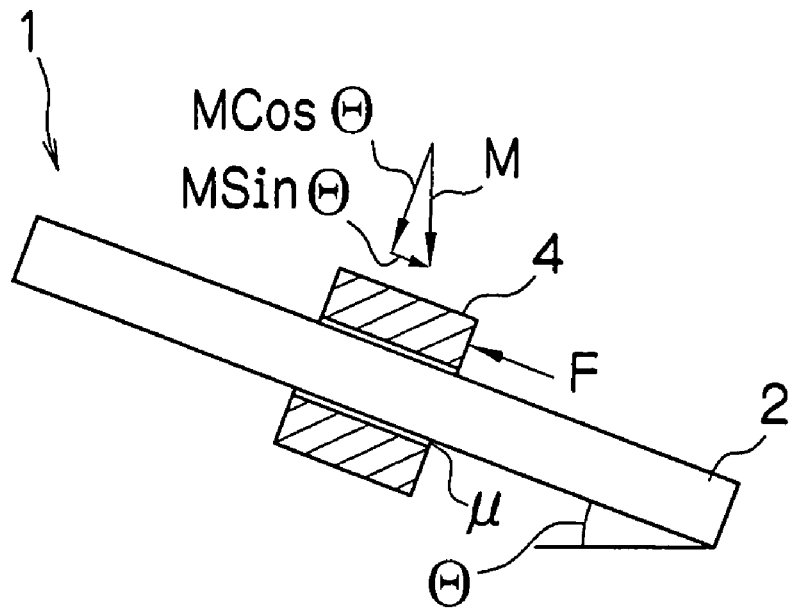
FIG. 15A and FIG. 15B are schematic views for illustrating problems with a conventional linear motor.
Figure 15B:
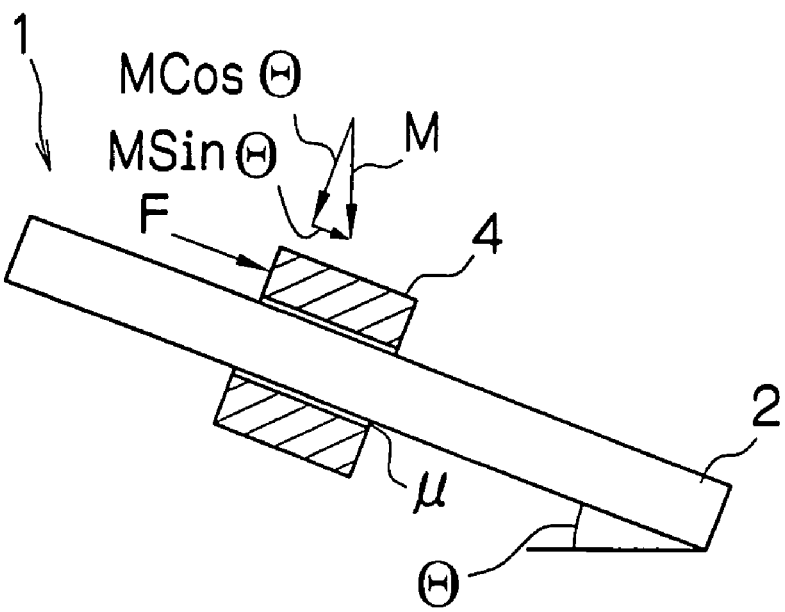

When the uniaxial drive unit 10 (the linear motor 1) is driven by energizing the moving part 16, even in the state in which the uniaxial drive unit 10 (the linear motor 1) is arranged at a predetermined inclination angle with respect to the horizontal plane (see FIG. 15), the fixed part 14 and the moving part 16 are balanced with each other by the balancing effect of the driving section 30. Therefore, there is no influence of the gravity etc. of the moving part 16, and hence the driving thrust is not varied.

Figure 4:
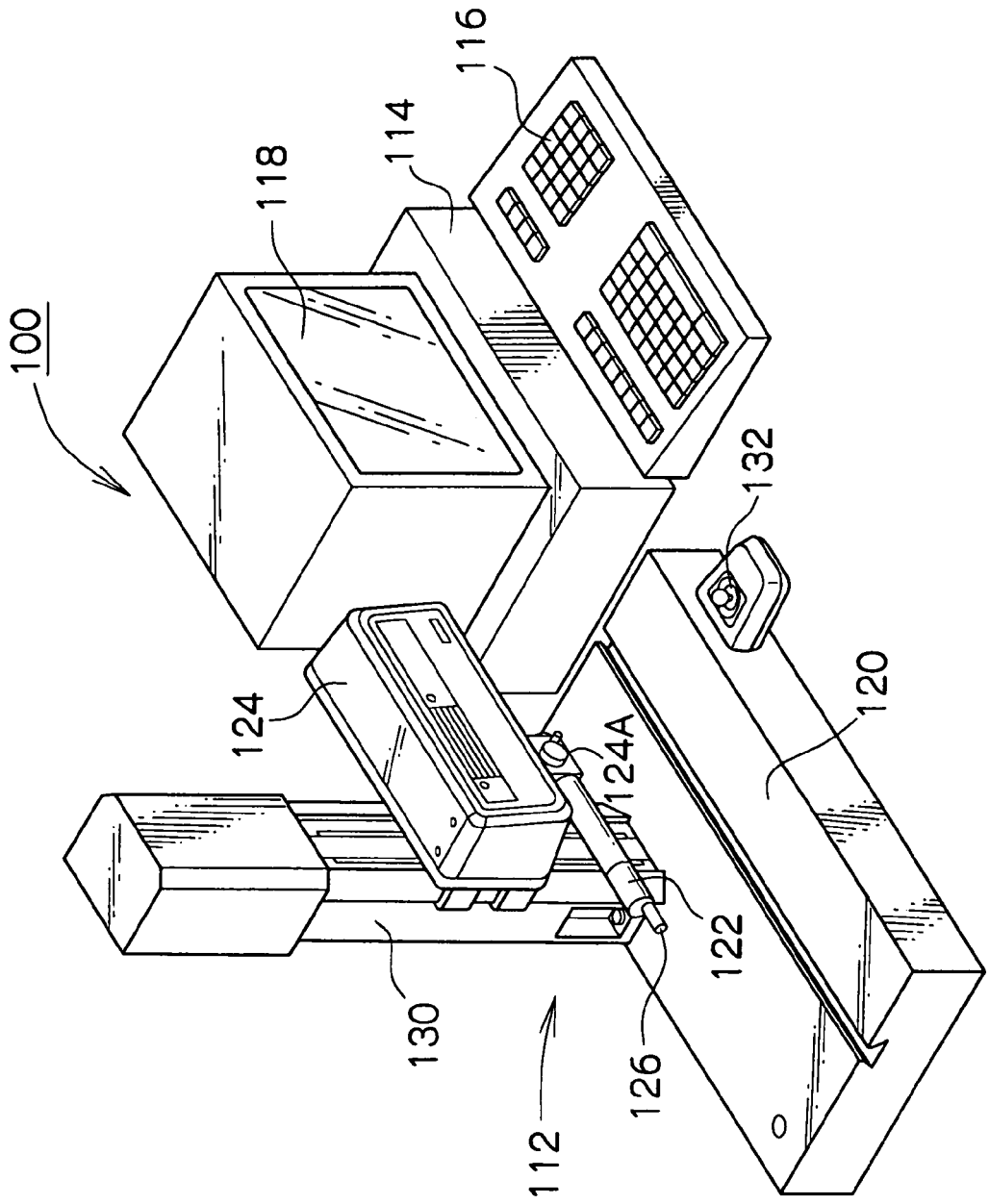
FIG. 4 is a perspective view showing the whole of a surface roughness measuring apparatus in accordance with an embodiment.
Figure 5:
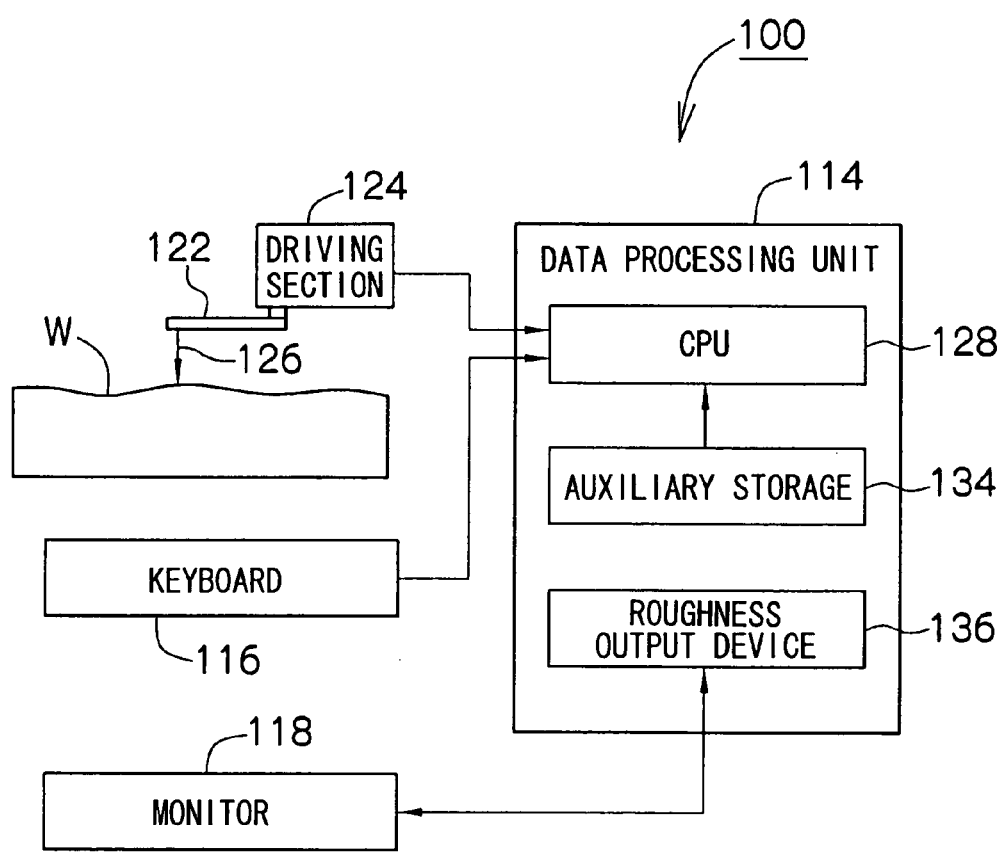
FIG. 5 is a block diagram showing a configuration of the surface roughness measuring apparatus shown in FIG. 4.

Next, a preferred embodiment (a second embodiment) of a surface roughness measuring apparatus, which is one example of a surface shape measuring apparatus using the uniaxial drive unit in accordance with the present invention, will be described in detail with reference to the accompanied drawings. FIG. 4 is a perspective view showing the whole of a surface roughness measuring apparatus 100 in accordance with the embodiment, and FIG. 5 is a block diagram showing a-configuration of the surface roughness measuring apparatus 100 shown in FIG. 4.

The surface roughness measuring apparatus 100 includes a measuring section (data output device) 112, a data processing unit 114, an input device (for example, a keyboard, a mouse: measurement region designating device, setting device) 116, a monitor 118, and a roughness output device 136. The measuring section 112 has a pickup 122 for measuring the surface roughness of a work W, shown in FIG. 5, mounted on a measurement bed 120, and the pickup 122 is supported on a holder 124A of a drive unit 124.

The pickup 122 has a probe 126 at the tip end thereof, and the displacement of the probe 126 is converted into a voltage by a differential transformer, not shown, incorporated in the drive unit 124. This voltage value is A/D converted by an A/D converter, and is sent to a CPU (measurement data acquiring device, calculating device, control device, comparing device) 128 of the data processing unit 114. Thereby, measurement data showing the surface roughness of the work W is acquired by the CPU 128.

As shown in FIG. 4, the drive unit 124 is installed to a column 130 erected on the measurement bed 120. Upon a command from the CPU 128 shown in FIG. 5, a motor (not shown) for moving the drive unit 124 vertically (in the Z direction) is driven, by which the whole of the drive unit 124 is moved vertically along the column 130. Also, upon a command from the CPU 128, a linear motor (described later) for moving the holder 124A transversely (the X direction) is driven, by which the holder 124A is moved transversely. The drive unit 124 can also be operated by a joystick 132 mounted in front of the measurement bed 120.

Also, as shown in FIG. 5, the data processing unit 114 incorporates an auxiliary storage 134 such as a hard disc or EEPROM, which is an electrically erasable and writable read-only memory.

Figure 6:
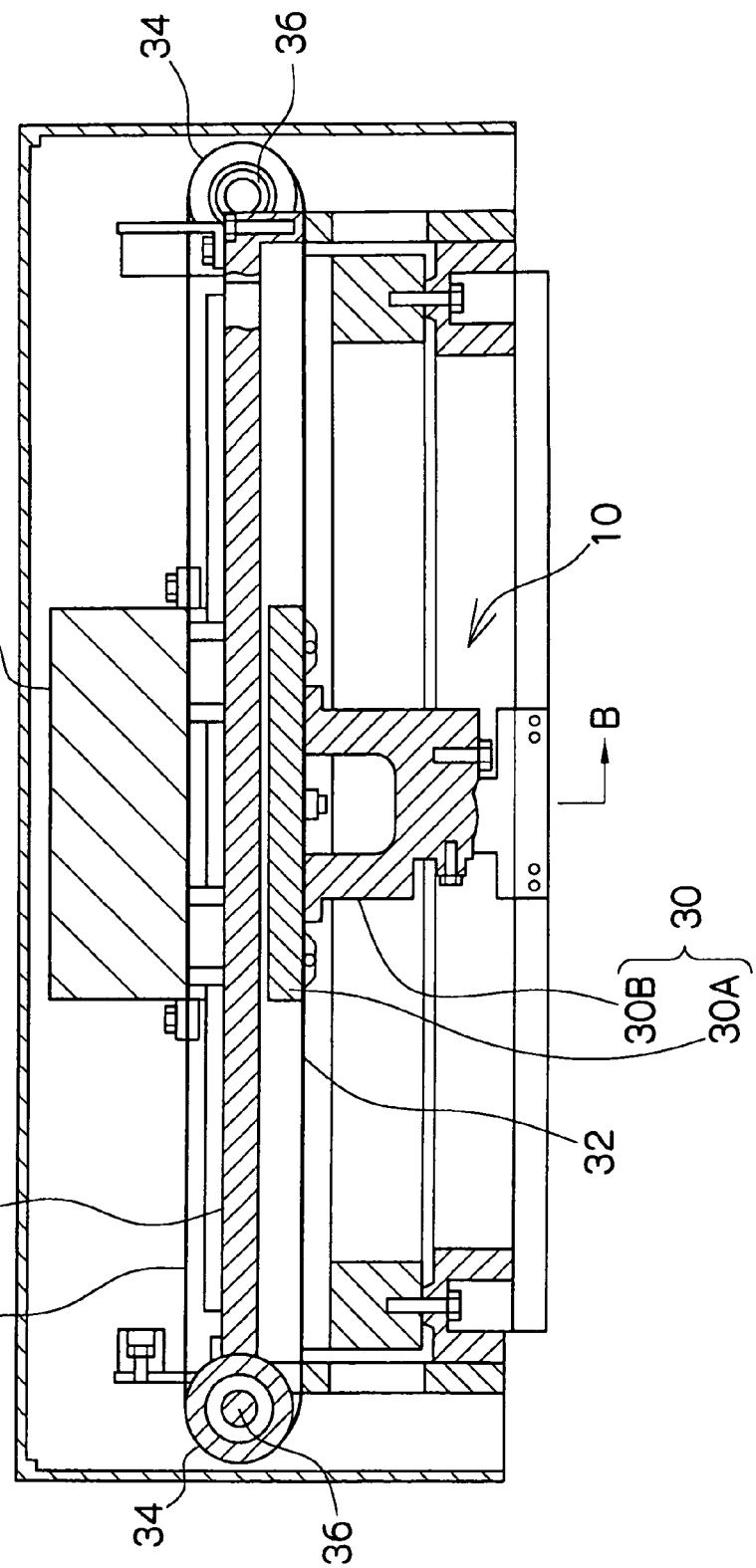
FIG. 6 is a sectional view showing the details of a drive unit in a surface roughness measuring apparatus.
Figure 7:
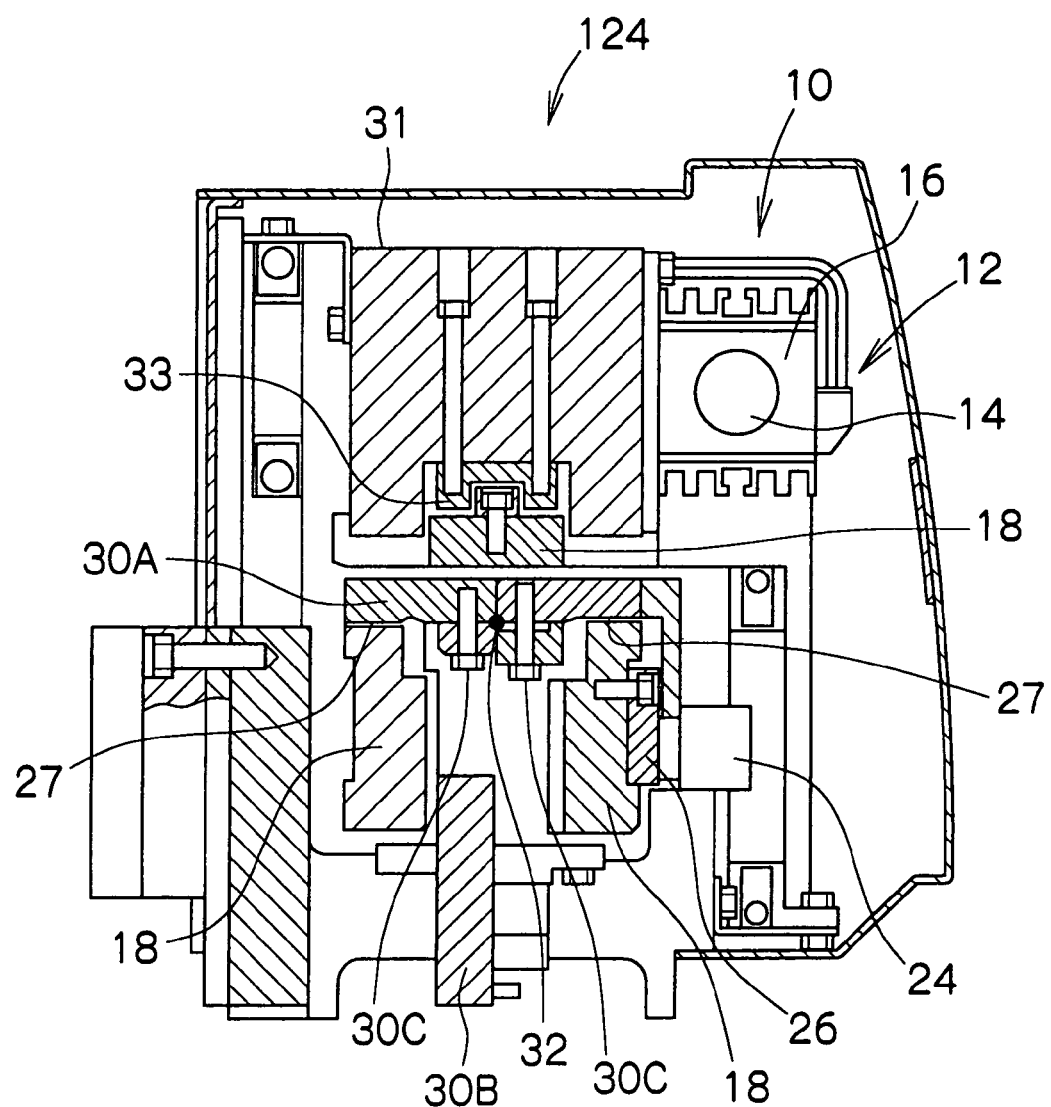
FIG. 7 is a sectional view taken along the line B—B of FIG. 6.

The following is a description of the details of the drive unit 124, which is a characteristic portion of the present invention. FIG. 6 is a sectional view showing the details of a drive unit 124, and FIG. 7 is a sectional view taken along the line B—B of FIG. 6. Most portions of the drive unit 124 are the same as those of the uniaxial drive unit 10 in accordance with the present invention. The same reference numerals are applied to the same or similar elements as or to those of the uniaxial drive unit 10 shown in FIGS. 1 to 3, and the explanation thereof is omitted.

In this embodiment, a point different from the uniaxial drive unit 10 of the first embodiment is that a balance weight 31 is fixed to the moving part 16 so as to balance with the driving section 30. The balance weight 31 is supported on the base plate 18 via a linear motion guide 33, and is slidable with respect to the base plate 18. The configuration of the linear motion guide 33 is the same as that of the aforementioned linear motion guide 27, so that the explanation thereof is omitted.

The driving section 30 is supported by the linear motion guides 27, 27, and is formed by a table portion 30A that is slidable with respect to the base plate 18 and a vertical section 30B which depends from the table section 30A and fixes a detecting section (the pickup 122, etc.) near the lower end thereof The table portion 30A and the vertical section 30B are integrated with each other by bolts 30C, 30C.

Also, the installation position of a combination of the encoder 24 for detecting the position in the uniaxial direction and the encoder scale 26 is different from that in the first embodiment. The head of the encoder 24 is fixed to the driving section 30, and the encoder scale 26 is fixed to the base plate 18. Even by such a combination, the position in the uniaxial direction of the driving section 30 can be detected accurately.

In the above-described configuration, it is preferable that the total weight of the balance weight 31 and the moving part 16 be in the range of 20% up and down with respect to the weight of the driving section 30, and it is more preferable that the total weight of the balance weight 31 and the moving part 16 be substantially equal to the weight of the driving section 30. By providing such a weight to the balance weight 31, the effects of the present invention can be achieved further as described above.

Also, in the above-described configuration, the end of the wire 32 (winding motion transmission member) is fixed to the driving section 30 in substantially the same plane as the slide face (in FIG. 7, the linear motion guides 27, 27) between the base plate 18 (unit body) and the driving section 30. By this configuration, a driving force from the liner motor 12 is transmitted to the point of action of the driving section 30 via the wire 32. Therefore, the linear motion guides 27, 27 are configured so as not to be shaky. vertically, and hence the operation accuracy of the driving section 30 is ensured.

In the above-described configuration, the driving section 30 is separated from the linear motor 12 through a predetermined distance, which solves a problem in that a dimensional error of the whole of unit occurs due to the heat generation in the linear motor 12.

Further, in the above-described configuration, the driving section 30 and the balance weight 31 are opposed vertically to each other with the base plate 18 held therebetween. Thereby, an effect that not only the weight balance of the whole of unit can be made good but also the whole of unit can be made compact can be achieved.

Figure 8:
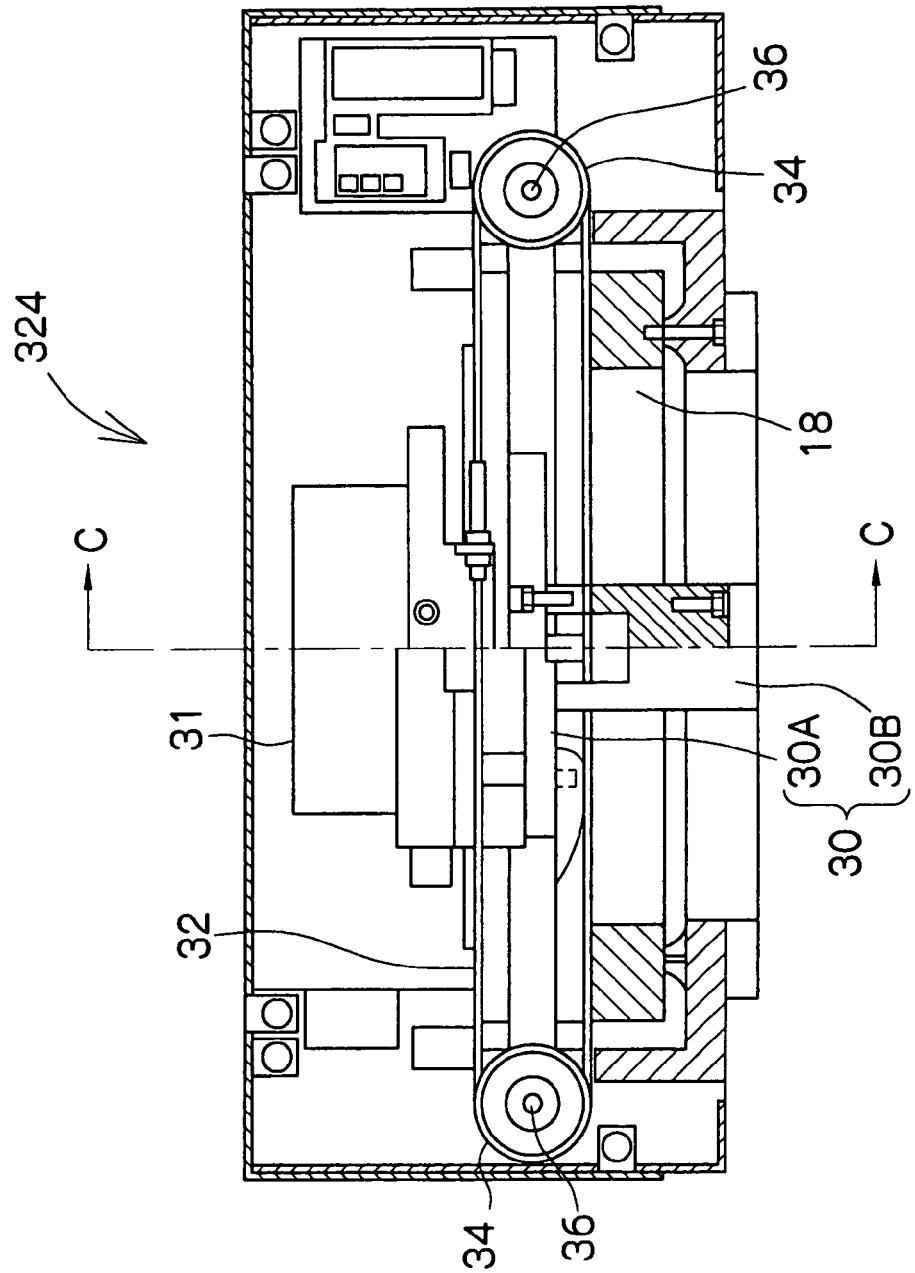
FIG. 8 is a sectional view showing the details of a drive unit in a surface roughness measuring apparatus using a uniaxial drive unit different from the present invention.
Figure 9:
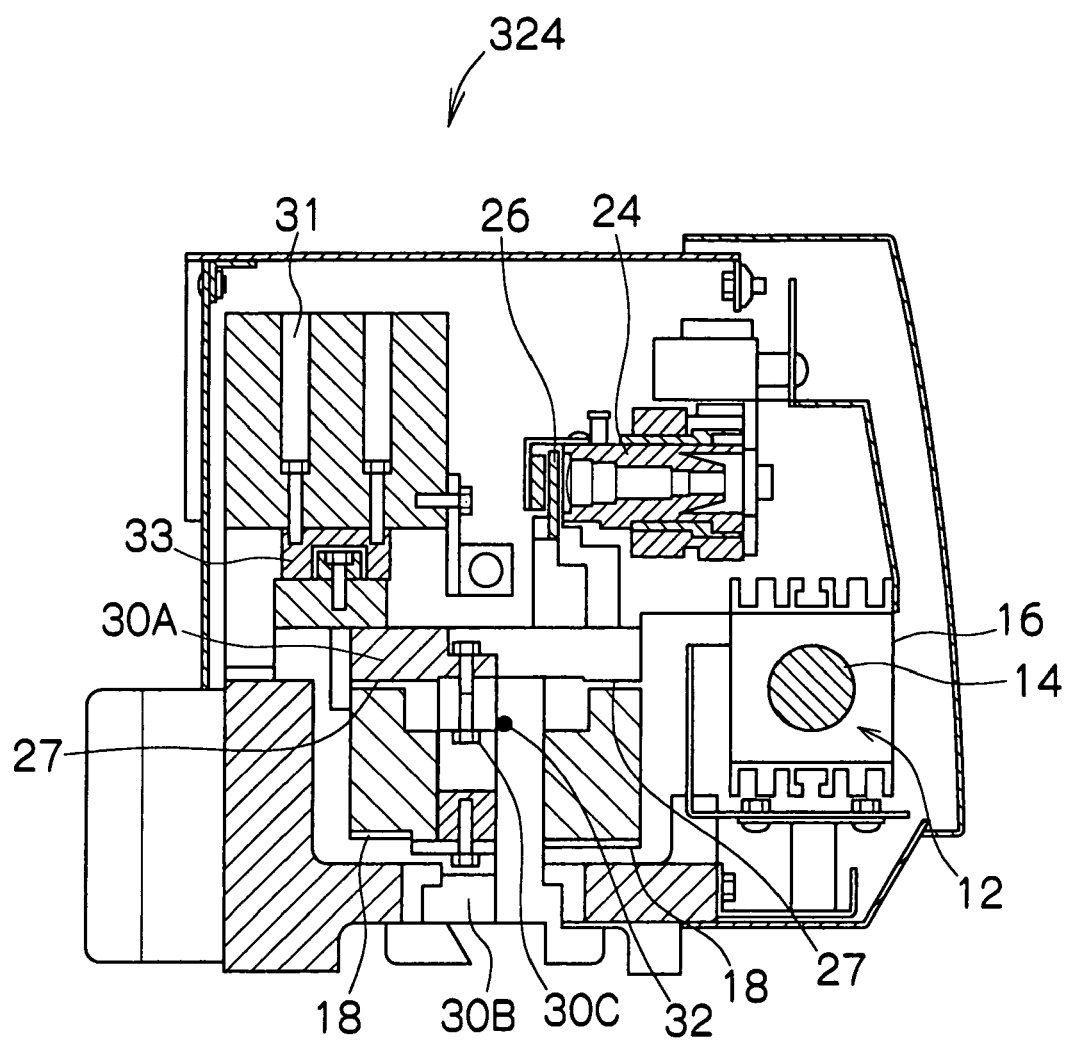
FIG. 9 is a sectional view taken along the line C—C of FIG. 8.

The above-described effects of the drive unit 124, which is a characteristic portion of the surface shape measuring apparatus in accordance with the present invention, are explained by comparing it with a driving section using another configuration. FIG. 8 is a sectional view showing the details of a drive unit 324 in a surface roughness measuring apparatus using a uniaxial drive unit different from the present invention, and FIG. 9 is a sectional view taken along the line C—C of FIG. 8. The same reference numerals are applied to the same or similar elements as or to those of the uniaxial drive unit 124 shown in FIGS. 6 and 7, and the explanation thereof is omitted.

In the drive unit 324 shown in FIGS. 8 and 9, unlike the drive unit 124 of the present invention, the driving section 30 is fixed to the moving part 16 of the linear motor 12. The driving section 30 is connected to the balance weight 31 by the wire 32 via the pulleys 34, 34 provided near both ends of the base plate 18 (unit body).

In the drive unit 324 configured as described above, the configuration is not such that the end of the wire 32 is fixed to the driving section 30 in almost the same plane as the slide face (in FIG. 9, the linear motion guides 27, 27) between the base plate 18 (unit body) and the driving section 30. Therefore, there is a fear that the linear motion guides 27, 27 are shaky vertically, and hence the operation accuracy of the driving section 30 is difficult to ensure.

Also, in the drive unit 324 configured as described above, the driving section 30 and the linear motor 12 are adjacent to each other. Therefore, there is a fear that a dimensional error of the whole of unit occurs due to the heat generation in the linear motor 12.

Further, in the drive unit 324 configured as described above, the driving section 30 and the balance weight 31 are opposed to each other in the slantwise vertical direction with the base plate 18 held therebetween. Therefore, not only the weight balance of the whole of unit is bad but also the whole of unit is difficult to make compact.

In addition to the above-described effects of the drive unit 124 in accordance with the present invention, according to the surface roughness measuring apparatus of the configuration in accordance with the present invention, advantageous effects, which are characteristic of the linear motor 12, of no maintenance, no worn parts, capability of low-vibration driving, wide speed range, high rigidity, simple construction, no backlash, etc. can be achieved.

Figure 10:
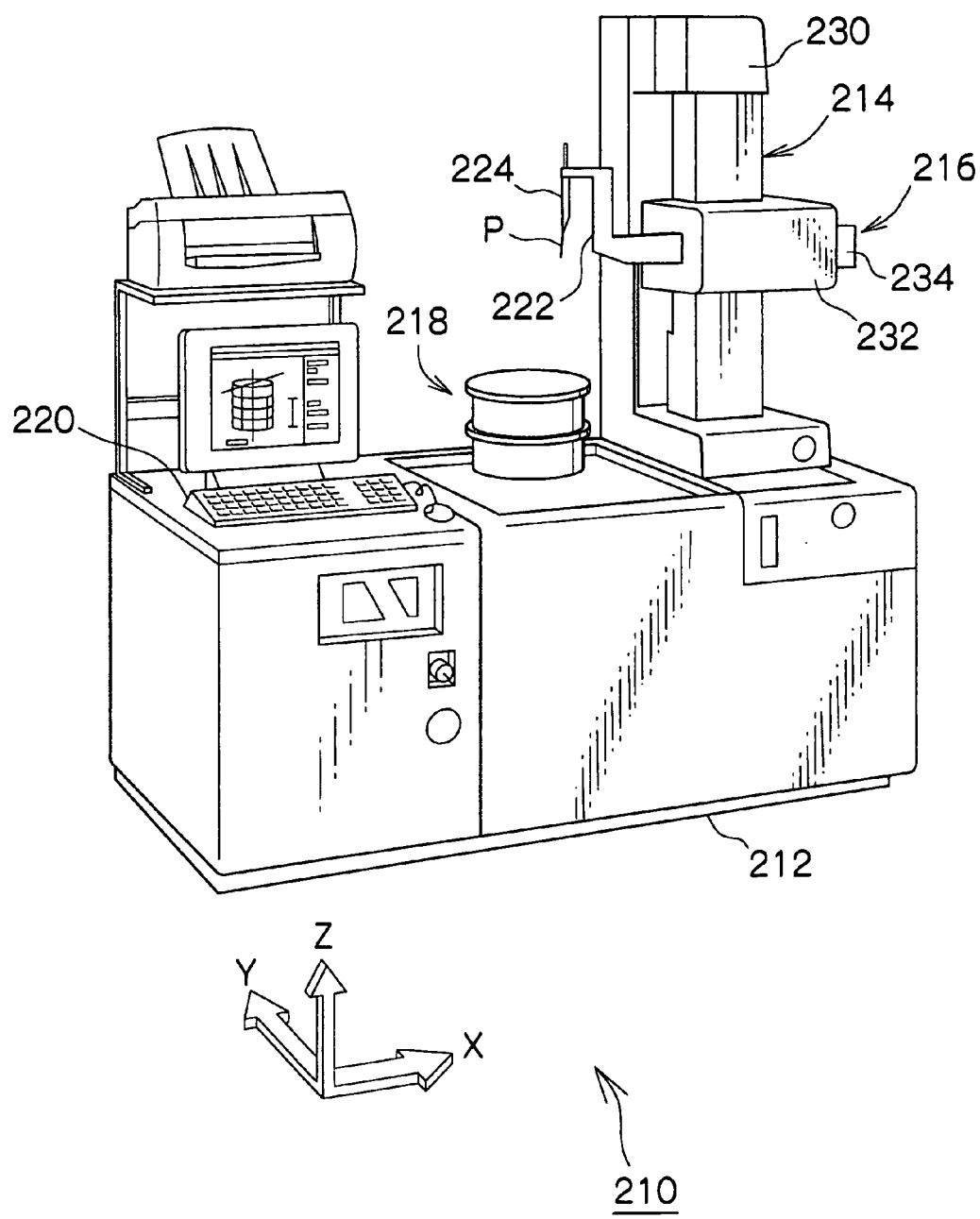
FIG. 10 is a perspective view showing the whole of a roundness measuring apparatus in accordance with an embodiment.

Next, a preferred embodiment (a third embodiment) of a-roundness measuring apparatus, which is another example of the surface shape measuring apparatus in accordance with the present invention, will be described in detail with reference to the accompanied drawings. FIG. 10 is a perspective view showing the whole of a roundness measuring apparatus 210 in accordance with this embodiment. The roundness measuring apparatus 210 includes an apparatus body 212, a Z-direction moving device 214 provided on the right-hand side on the apparatus body 212, an X-direction moving device 216 supported on the Z-direction moving device 214, a detector holder 222 which is supported by the left end portion of the X-direction moving device 216 so as to be turnable around the X axis, a detector 224 supported by the tip end portion of the detector holder 222 so as to be turnable, a work table 218 provided substantially in the center on the upper surface of the apparatus body 212, and a control panel 220 provided on the left-hand side on the upper surface Of the apparatus body 212. At the tip end of the detector 224, a probe P is provided.

Figure 11A:
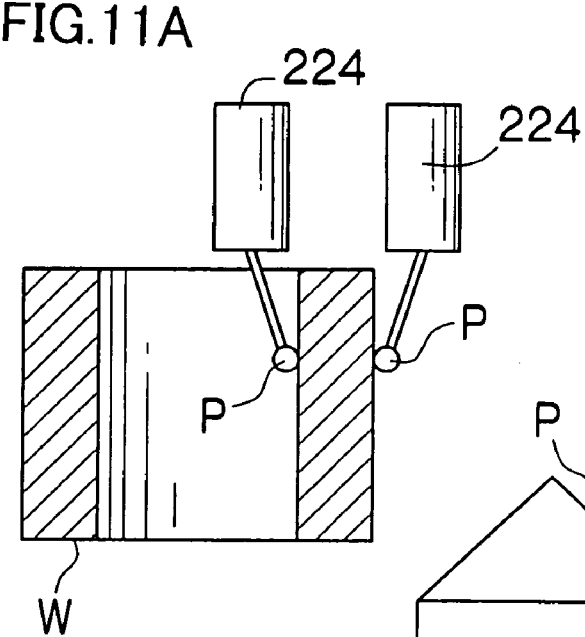
FIG. 11A and FIG. 11B are conceptional views for illustrating measurement points of an object under test.
Figure 11B:
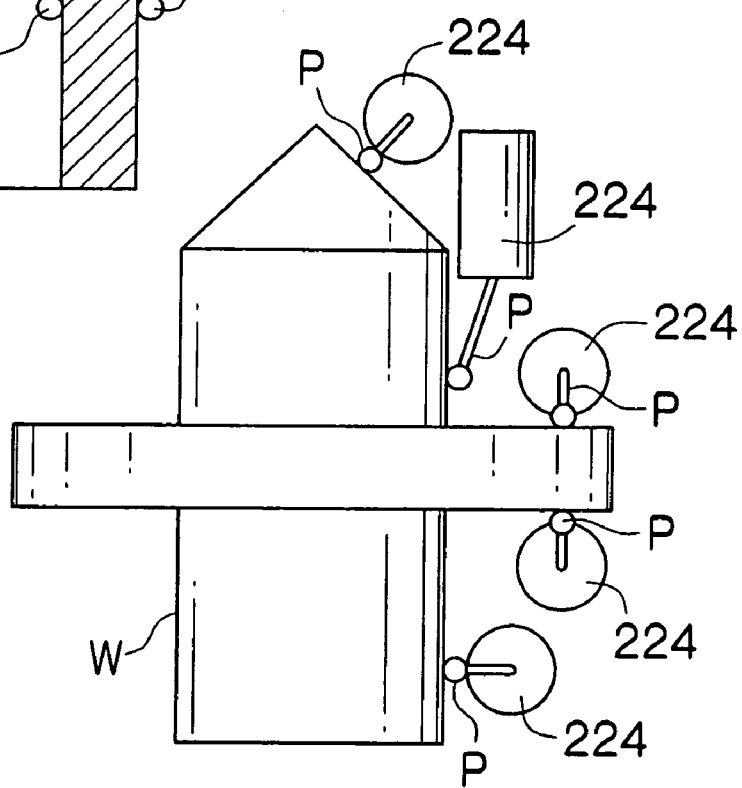

FIG. 11 is a conceptual view for illustrating measurement points of an object under test W, showing a state in which the probe P of the detector 224 is pressed on the inner and outer peripheral surfaces of the cylindrical object under test W (FIG. 11A), and a state in which the probe P of the detector 224 is pressed on the conical portion, column outside surface, flange portion upper surface, and flange portion lower surface (FIG. 11B).

The roundness measuring apparatus 210 is configured so that the detector 224 and the probe P can be positioned automatically to make various kinds of measurement (coaxiality, cylindricity, etc.) in the above-described states.

The following is a description of the outline of each element. The Z-direction moving device 214 is provided on the right-hand side on the upper surface of the apparatus body 212, and is formed by a combination of a stand 230 provided with a Z-direction table and a measurement stage 232 vertically moving along the Z-direction table. The vertical movement (Z-direction movement) of the measurement stage 232 may be performed manually (for example, button operation or joystick operation), or may be preformed automatically by inputting the shape, dimensions, kind of measurement (coaxiality, cylindricity, etc.), etc. of the object under test W to the control panel 220.

The X-direction moving device 216 is supported on the Z-direction moving device 214, is formed by a combination of the measurement stage 232 and a horizontal arm 234 that is provided so as to penetrate the measurement stage 232 so as to be movable in the transverse direction (X-direction) with respect to the measurement stage 232. The transverse movement (X-direction movement) of the horizontal arm 234 may be performed manually (for example, button operation or joystick operation), or may be performed automatically by inputting the shape, dimensions, kind of measurement (coaxiality, cylindricity, etc.), etc. of the object under test W to the control panel 220.

The work table 218 is provided substantially in the center on the upper surface of the apparatus body 212, and is formed into a disc shape so as to be capable of being rotationally driven. The rotational speed thereof may be changed stepwise or may be changed continuously. The configuration may be such that centering adjustment and tilting adjustment can be made. Also, an automatic eccentricity correcting function and an automatic tilt correcting function can be provided.

The control panel 220 is provided on the left-hand side on the upper surface of the apparatus body 212, and is formed so as to be capable of inputting measurement information (including the shape information of object under test W) and outputting the results of various operations of unit, the measurement results, etc. The control panel 220 shown in FIG. 10 uses a personal computer. The input work is done mainly by using a keyboard, and the output is carried out by using a display (liquid crystal panel) and a printer. Various types of control of the roundness measuring apparatus are carried out by a CPU incorporated in the control panel 220. In a low-price unit, the control panel 220 does not use a personal computer, and a panel dedicated to the unit can be used.

As the detector 224, a lever probe type detector is used in which a differential transformer is used to detect displacement, and the probe P is pressed on an object under test W. The use of any other type of detector is not excluded. The detector 224 may be such that the force for pressing the probe P on an object under test W, that is, the measuring force is fixed to a single value (for example, 70 mN), or may be such that the measuring force is variable (for example, 30 to 100 mN) according to the shape, dimensions, kind of measurement (coaxiality, cylindricity, etc.), etc. of an object under test W.

Figure 12:
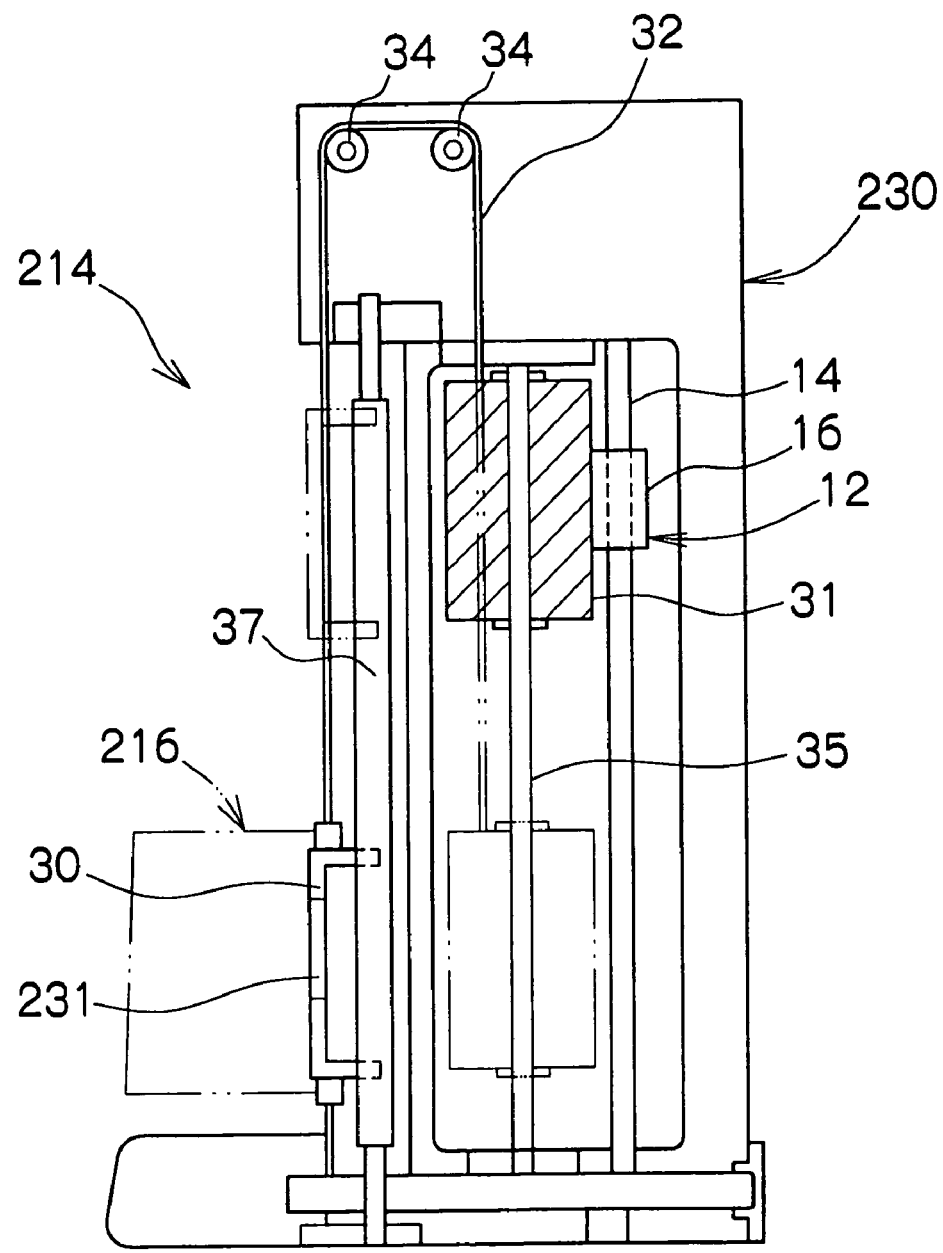
FIG. 12 is a schematic sectional view of a stand of a roundness measuring apparatus.
Figure 13:
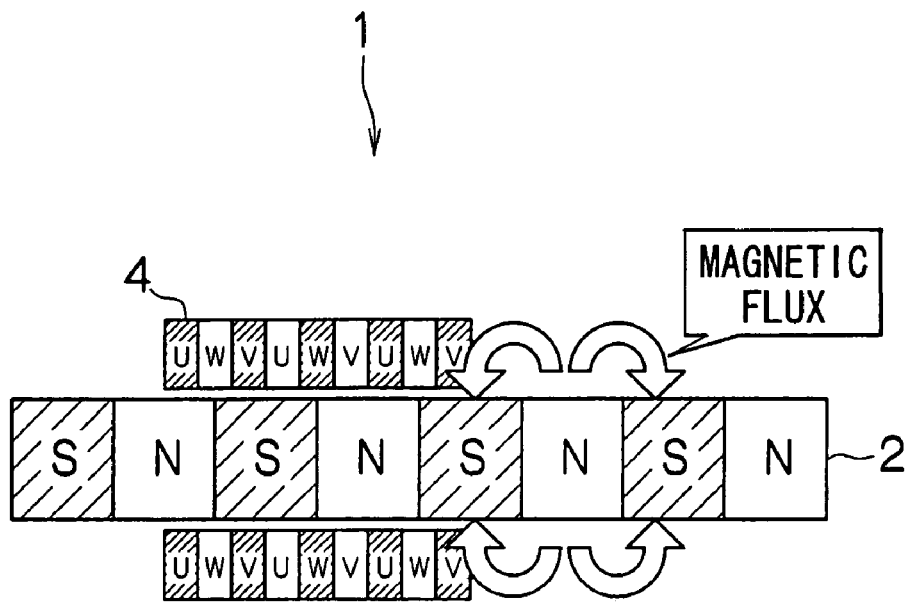
FIG. 13 is a sectional view showing the outline of a conventional linear motor.

FIG. 12 is a schematic sectional view (right-hand side sectional view) of the stand 230, the view being for illustrating the configuration of the Z-direction moving means 214. In the example of the surface roughness measuring apparatus 100 of the second embodiment (see FIGS. 4 to 6), a configuration is used in which the driving section 30 is connected to the moving part 16 by the wire 32 via the pulleys 34, 34 provided near both ends of the linear motor 12. On the other hand, in the example of this embodiment, a configuration is used in which the pulleys 34, 34 are provided near the upper end of the linear motor 12, and the wire 32 is set around these pulleys to balance the moving part 16 and the balance weight 31 with the driving section 30.

Specifically, at the rear (at the right in FIG. 12) in the stand 230, the linear motor 12 is disposed vertically, and the moving part 16 of the linear motor 12 and the balance weight 31 are fixed to each other. Also, at the front (at the left in FIG. 12) on the outside of the stand 230, a guide shaft 37 is disposed vertically. The driving section 30 is configured so as to be slidable vertically along the guide shaft 37. Also, to the driving section 30 is fixed a Z-direction table 231 for supporting the X-direction moving device 216 (indicated by an imaginary line).

The balance weight 31 having a weight balancing with the total weight of the driving section 30, the Z-direction table 231, and the X-direction moving device 216 together with the weight of the moving part 16 is connected to the driving section 30 by the wire 32 via the pulleys 34, 34 provided near the upper end of the linear motor 12.

According to the above-described configuration, balance can be attained by the moving part 16 and the balance weight 31 which have substantially the same weight as the sum of the weights of the driving section 30 and the total weight of other elements (in this example, the Z-direction table 231 and the X-direction moving device 216). Therefore, there is no influence of the gravity etc. of the moving part 16 and the driving section 30, the driving thrust is not varied, and no dimensional accuracy error occurs due to heat generation etc.

The above is a description of the examples of embodiments of the uniaxial drive unit in accordance with the present invention and the surface shape measuring apparatus using the said drive unit. The present invention is not limited to the examples of the above-described embodiments, and various changes and modifications can be made.

For example, in the example of the uniaxial drive unit 10 of the above-described embodiment, the configuration is used in which the driving section 30 is connected to the moving part 16 by the winding motion transmission member (the wire 32) via the winding motion transmission support members (the pulleys 34, 34) provided near both ends of the linear motor 12. However, the configuration as shown in FIG. 12 can be used in which the winding motion transmission support member (the pulley 34) is provided near one end of the linear motor 12.

For example, in the case where vertical motion is performed by using the uniaxial drive unit 10, a configuration can be used in which the winding motion transmission support member (the pulley 34) is provided near the upper end of the linear motor 12, and the winding motion transmission member (the wire 32) is wound around the winding motion transmission support member to balance the moving part 16 with the driving section 30.

Besides the configuration using a combination of the winding motion transmission support member (the pulley 34) and the winding motion transmission member (the wire 32), any other configuration in which the driving section 30 and the moving part 16 are arranged so as to balance with each other can be used.

For example, in the case where vertical motion is performed by using the uniaxial drive unit 10, a configuration can be used in which the driving section 30 is balanced with the moving part 16 via a manometer (communicating tube). In this case, for example, vertically movable cover members that close the head (top end) of mercury in the manometer at both ends are provided, by which the weights of the driving section 30 and the moving part 16 are received by these cover members at both ends.

In the example of the surface shape measuring apparatus of the above-described embodiment, the configuration is used in which the driving section 30 is connected to the moving part 16 by the,winding motion transmission member (the wire 32) via the winding motion transmission support member (the pulley 34) provided near both ends or one end of the linear motor 12. However, besides the configuration using a combination of the winding motion transmission support member (the pulley 34) and the winding motion transmission member (the wire 32), any other configuration in which the driving section 30 and the moving part 16 are arranged so as to balance with each other can be used.

If a portion at the periphery of the linear motor 12 is formed of a metallic material, which is a magnetic material, the magnetic force of the linear motor 12 is influenced by the peripheral magnetic material. As a result, there may be a fear that the driving thrust of the linear motor 12 is liable to vary. In such a case, a configuration as described below can be used.

A surface shape measuring apparatus can be used which has a configuration such as to incorporate a uniaxial drive unit including a linear motor having a fixed part which is a rod-shaped magnet in which the N poles and the S poles are arranged alternately in a linear form, and a moving part which is a ring-shaped member having a coil member, fitted on the fixed part, and capable of moving linearly along the fixed part; a unit body; and a moving table which is supported so as to be slidable in the uniaxial direction with respect to the unit body, characterized in that one of the fixed part and moving part is fixed to the unit body, and the other thereof is fixed to the moving table; and of the unit body and the moving table, at least a portion at the periphery of the linear motor is formed of a nonmagnetic material.

According to this configuration, since the portion at the periphery of the linear motor is formed of a nonmagnetic material, the magnetic force of the linear motor is not influenced by the peripheral magnetic material (metallic material, etc.). As a result, the driving-thrust of the linear motor is less liable to vary.

Also, a surface shape measuring apparatus can be used which has a configuration such as to incorporate a uniaxial drive unit including a linear motor having a fixed part which is a rod-shaped magnet in which the N poles and the S poles are arranged alternately in a linear form, and a moving part which is a ring-shaped member having a coil member, fitted on the fixed part, and capable of moving linearly along the fixed part; a unit body; and a moving table which is supported so as to be slidable in the uniaxial direction with respect to the unit body, characterized in that one of the fixed part and moving part is fixed to the unit body, and the other thereof is fixed to the moving table; the slide face between the unit body and the moving table and the axis of the fixed part of the linear motor are arranged in substantially the same plane; and the slide face between the unit body and the moving table is separated from the linear motor through a predetermined distance.

According to this configuration, the slide face between the unit body and the moving table is separated from the linear motor through a predetermined distance. Therefore, the magnetic force of the linear motor is not influenced by the peripheral magnetic material (metallic material, etc.). As a result, the driving thrust of the linear motor is less liable to vary. Also, the slide face between the unit body and the moving table and the axis of the fixed part of the linear motor are arranged in substantially the same plane. Therefore, there is less influence of rolling and pitching. Also, even when there is some influence of yawing, this influence can be reduced if the length of slide face between the unit body and the moving table has a predetermined value.

Also, since the slide face between the unit body and the moving table is separated from the linear motor through a predetermined distance, the heat generated in the linear motor is less liable to reach the whole of unit.

What is claimed is:

1. A surface shape measuring apparatus, comprising:
   a measurement bed in which an object under test is set on;
   a column which is vertically erected on the measurement bed;
   a base plate which is vertically movable along the column;
   a drive unit which moves the base plate vertically along the column;
   a linear motor which includes a fixed part which is a rod-shaped magnet fixed to the base plate transversely and formed so that the N poles and the S poles are arranged alternately, and a moving part which is a ring-shaped member having a coil member, fitted on said fixed part, and capable of moving along said fixed part,
   a linear motion guide which is provided parallel to the base plate;
   a driving section which is slidable in the transverse direction along the linear motion guide,
   a winding motion transmission support member which is provided near ends of the linear motor;
   a winding motion transmission member, which is wound around the winding motion transmission support member, that connects the driving section to the moving part or a member fixed to the moving part and thereby transmits driving force of said linear motor to said driving section; and
   a detecting section which is fixed to the driving section,
   wherein the surface shape measuring apparatus measures a surface shape of an object under test by relatively moving the detecting section provided on the measurement bed along the surface of the object under test.

2. The surface shape measuring apparatus according to claim 1, wherein the surface shape measuring apparatus measures a surface roughness of the object under test.

3. The surface shape measuring apparatus according to claim 2, further comprising a balance weight fixed to said moving part so as to balance with said driving section.

4. The surface shape measuring apparatus according to claim 3, wherein the total weight of said balance weight and said moving part is approximately equal to the weight of said driving section.

5. The surface shape measuring apparatus according to claim 3, wherein the total weight of said balance weight and said moving part is in the range of 20% up and down with respect to the weight of said driving section.

6. The surface shape measuring apparatus according to claim 2, wherein the end of said winding motion transmission member is fixed to said driving section in substantially the same plane as the slide face between said unit body and said driving section.

7. A surface shape measuring apparatus, comprising:
   a unit body having ends;
   a work table in which an object under test is set on, and rotatably provided in the unit body;
   a rotational driving device which rotates the work table;
   a linear motor which includes a fixed part which is a rod-shaped magnet fixed to a unit body vertically and formed so that the N poles and the S poles are arranged alternately, and a moving part which is a ring-shaped member having a coil member, fitted on the fixed part, and capable of moving along the fixed part;
   a guide shaft which is provided vertical to the unit body;
   a driving section which is vertically slidable along the guide shaft;
   a winding motion transmission support member which is provided near an upper end or both ends of the unit body;
   a winding motion transmission member, which is wound around the winding motion transmission support member, that connects the driving section to the moving part or a member fixed to the moving part and thereby transmits driving force of the linear motor to the driving section;
   a measurement stage which is vertically fixed on the driving section;
   a horizontal arm which is provided so as to be movable in a transverse direction with respect to the measurement stage;

a detecting section which is fixed to the horizontal arm,
wherein the surface shape measuring apparatus measures a surface shape of an object under test by relatively moving the detecting section provided on the measurement bed along the surface of the object under test.

8. The surface shape measuring apparatus according to claim 7, wherein the surface shape measuring apparatus is a roundness measuring apparatus for measuring the roundness of an object under test.

9. The surface shape measuring apparatus according to claim 8, wherein an end of the winding motion transmission member is fixed to the driving section in substantially the same plane as a slide face between the unit body and the driving section.

10. The surface shape measuring apparatus according to claim 8, wherein a balance weight is fixed to the moving part so as to balance with the driving section.

11. The surface shape measunng apparatus according to claim 10, wherein the total weight of the balance weight and the moving part is approximately equal to the weight of the driving section.

12. The surface shape measuring apparatus according to claim 10, wherein the total weight of the balance weight and the moving part is in the range of 20% up and down with respect to the weight of the driving section.

* * * * *